United States Patent

[11] 3,627,453

[72] Inventor Wallace Clark
 1830 S. German Church Road,
 Indianapolis, Ind. 46239
[21] Appl. No. 53,852
[22] Filed July 10, 1970
[45] Patented Dec. 14, 1971

[54] PUMPS AND MOTORS HAVING ECCENTRIC SHAFT SEALING MEANS
 12 Claims, 14 Drawing Figs.
[52] U.S. Cl................................................ 418/48,
 418/142, 277/34.3
[51] Int. Cl..................................................... F01c 1/10,
 F01c 5/00, F03c 3/00
[50] Field of Search............................... 418/140,
 48, 142, 143; 277/34.3

[56] References Cited
 UNITED STATES PATENTS
2,028,407 1/1936 Moineau ........................ 418/48

3,324,801 6/1967 Fernholtz ..................... 418/48

Primary Examiner—Carlton R. Croyle
Assistant Examiner—Richard E. Gluck
Attorney—Melville, Strasser, Foster & Hoffman ABSTRACT: A pump or motor of the type having a pair of helical gears fitted one within the other to define a rotor and a stator, the gear members being received in a cylindrical casing from which at least one end of the inner gear member projects, the casing being sealed by a multiple part sealing member comprising a circular sealing ring engaging the inner surface of the casing and rotatable relative thereto, the sealing ring having an eccentrically disposed circular opening therein through which the inner gear member freely passes, the inner gear member mounting a tire which makes sealing contact with the periphery of the circular opening in the sealing ring, the tire also contacting the inner surface of the casing at one side thereof, the tire and sealing ring being movable relative to each other and to the casing, the sealing member acting to close and seal the casing irrespective of relative rotational and gyrating movement between the inner and outer gear members.

PATENTED DEC 14 1971

INVENTOR/S
WALLACE CLARK,
BY *Melville, Strasser, Foster and Hoffman*
ATTORNEYS

INVENTOR/S
WALLACE CLARK,

BY *Melville, Strasser, Foster and Hoffman*
ATTORNEYS

PUMPS AND MOTORS HAVING ECCENTRIC SHAFT SEALING MEANS

BACKGROUND OF THE INVENTION

The present invention relates to pairs of helical gears of the type disclosed and claimed in Moineau U.S. Pat. Nos. 1,892,217 and 2,028,407, together with other patents to the same inventor. Devices in accordance with the Moineau patents have become well known commercially in the form of pumps and compressors marketed under the trademark MOYNO by Robbins & Myers Inc., of Springfield, Ohio, U.S.A. The conventional Moyno pump comprises a fixed element of stator having internal helical threads and a rotor element received within the stator and having one less helical thread than the stator. When motive power is applied to the rotor, a series of continuously moving pumping pockets are formed between the rotor and stator which will draw a liquid trough the device.

It has also been proposed to use such devices as motors, in which event a liquid is pumped through the device so as to cause the motor to turn with respect to the stator. Characteristically, the rotor of a MOYNO pump or motor rotates relative to the stator in one direction, while at the same time gyrating relative to the stator in the opposite direction. This is due to the fact that the rotor axis is eccentric with respect to the axis of the stator. Consequently, a connecting rod and double universal joint arrangement is necessary to effect a driving connection between the rotor and a drive or driven shaft rotating about a fixed axis.

It has also been proposed to utilize the outer gear member of a helical gear motor as a rotor, in which event the inner gear of the motor is fixed against rotation, although it remains free to grate in a circular path so that the passage of a driving fluid through the pockets defined by the gears causes the outer gear to rotate. In such devices, it is necessary for the connecting rods, universal joints or the like to be housed within a casing or compartment formed as a sealed extension of the motor housing. Because of the gyrating movement of the inner gear member, there has hitherto been no effective way to seal the motor without also incorporating the connecting rod and universal joints within the sealed area of the unit. Similar considerations apply to the use of the device as a pump since means must be provided to effectively interconnect the gyrating rotor (the inner gear member) to a source of power, such as an electric motor.

In contrast to the foregoing, the present invention provides an eccentric shaft seal which effectively choses or both ends of the pump or motor while permitting the inner gear member to project beyond the seal, thereby enabling the user to place the connecting rod, universal joints or the like outside the sealed compartment where the parts may be readily inspected and also easily repaired or replaced. As applied to a pump, the eccentric seal makes possible the use of a relatively simply belt drive arrangement to connect the pump rotor to a prime mover, such as a conventional electric motor.

RESUME OF THE INVENTION

The present invention is applicable to both pumps and motors of the MOYNO type, and is applicable to such devices irrespective of whether the inner or outer gear member rotates and/or gyrates relative to the other.

In accordance with the invention, the outer gear member is mounted in a cylindrical casing or housing and at least one end of the inner member is adapted to project outwardly beyond the corresponding end of the surrounding casing. The casing is sealed by a sealing member comprising a circular sealing ring fitted in the casing with the periphery of the ring preferably engaging an annular groove in the inner wall surface of the casing. The sealing ring has an eccentrically disposed circular opening trough which the end of the inner gear member projects, the inner gear member lying in concentric relation to the opening and mounting a resilient tire the periphery of which contacts and seals against the periphery of the opening. The tire is of lesser diameter than the inside diameter of the casing, but the dimensioning of the parts is such that the tire will contact the casing and move relative to its inner surface upon relative movement between the inner and outer gear members. When the inner member is threaded to rotate in a counterclockwise direction, it will at the same time gyrate in a circular path in a clockwise direction if the casing and outer members are held against rotation. In this event, the tire will also rotate in a counterclockwise direction relative to the casing, and at the same time will gyrate in a clockwise direction. At the same time the sealing ring will be rotated in a clockwise direction and the eccentrically disposed circular opening in the sealing ring will orbit relative to the tire and inner gear member, the tire in effect pushing the opening in the ring ahead of it as the tire gyrates with the inner gear member.

In the embodiment of the invention wherein the inner gear member is held against rotation but permitted to gyrate, and the outer gear member and casing rotate relative to the inner gear member, and again assuming of the inner gear member is threaded to rotate in a counterclockwise direction (although it is held against rotation), the sealing ring will rotate in a clockwise direction in unison with the outer gear member and casing, whereas the circular opening in the sealing ring will orbit in a clockwise direction relative to the fire as the tire gyrates in a clockwise direction, the tire effectively sliding along the inner surface of the casing and the periphery of the opening. In either embodiment it will be understood that the threads may be either right or left hand and the relative directions of movement will change accordingly.

The tire may be conveniently mounted on a rim fixedly secured to the inner gear member and it may be either solid or of tubular configuration, the hollow tube being filled with a suitable fluid under sufficient pressure to maintain the tire in inflated condition. The tire may have a tread of a size to engage about the marginal edges of the opening in the sealing ring; and two or more juxtaposed sealing rings may be employed, with their openings in axial alignment, in which event the tire may be provided with an annular tread portion engageable with each of the openings, thus providing means for sustaining hydraulic thrust as well as maintaining a seal.

Where an eccentric seal is required at only one end of the device, the opposite end of the inner gear member nonetheless may be stalilized by using the tire alone, the tire contacting the casing and hence maintaining the inner gear member at a uniformly spaced distance relative to the inner surface of the casing irrespective of relative rotation and/or gyration of the inner gear member.

The invention also contemplates a pump construction wherein the connecting rod and universal joint assembly between the inner gear member and the prime mover is eliminated, the inner gear member being rotted by a sheave and belt arrangement, including a spring-biased idler sheave to maintain the belt taut as the inner gear member gyrates. Side pull on the inner gear member is effectively eliminated by a hydraulic follower which exerts a constant pressure against the inner gear member equal to the side pull of the beltdrive.

DESCRIPTION OF THE PREFERRED EMBODIMENTS

Figure 1:
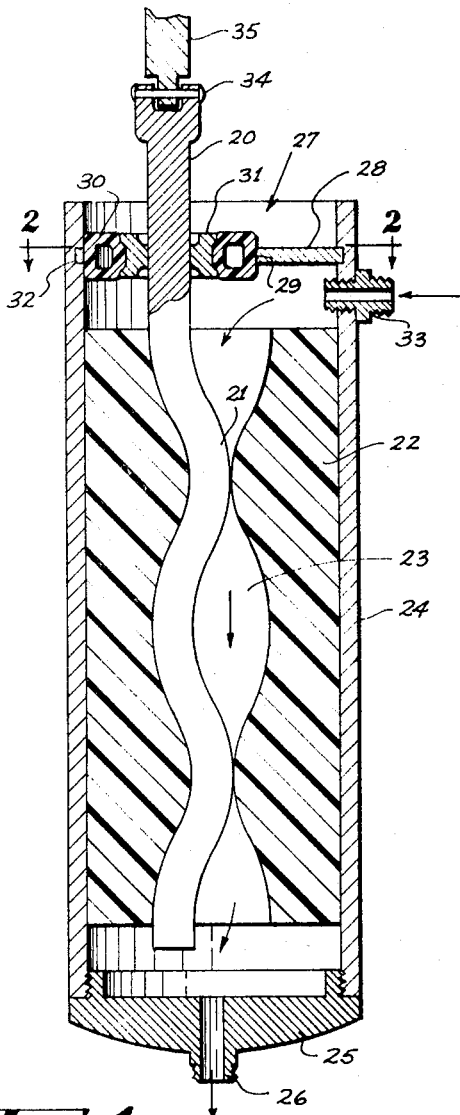
FIG. 1 is a vertical sectional view trough a pump embodying the sealing means of the present invention.
Figure 2:
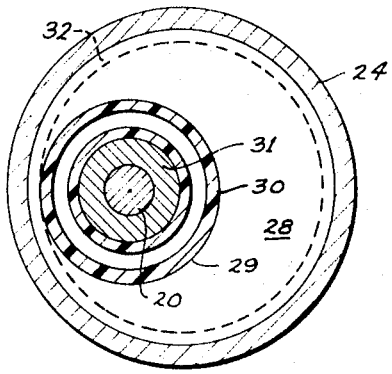
FIG. 2 is a sectional view taken along the line 2—2 of FIG. 1.

Referring first to FIGS. 1 and 2 of the drawings, the basic components of the pump or motor comprise an inner gear member 20 having one or more helical threads 21 received in an outer gear member 22 preferably formed from a resilient material, such as rubber, having internal helical threads 23 in which the inner gear member is received. As previously indicated, the outer gear member 22 will have one more helical thread than the inner gear member. The outer gear member 22 is fixedly secured to a casing 24 which is of cylindrical configuration.

In the embodiment illustrated, which is representative of a pump construction, the lowermost end of the casing is closed by a cap member 25 having an outlet port 26 therein. The opposite end of the casing is closed by a sealing member, indicated generally at 27, which in its essential components comprises a circular sealing disc or ring 28 having an eccentrically disposed circular opening 29 therein, the opening being closed by a tire 30 mounted on a rim 31 fixedly secured to the inner gear member 20. The tire is thus fixed against rotation relative to the inner gear member but moves with the latter as it rotates and/or gyrates. The periphery of the sealing ring 28 is preferably received in an annular groove 32 formed in the inner wall surface of the casing 24; the location of the circular opening 29 is such that its periphery substantially coincides with inner wall surface of the casing 24 at its point of closest approach. The tire 30 also contacts the inner surface of the casing on each side of the sealing ring the manner illustrated. The sealing ring is free to rotate in the annular groove 32 in a manner to be explained more fully hereinafter.

Preferably, an inlet port 33 is provided in the casing 24 intermediate the sealing member 27 and the adjacent end of the outer gear member 22; thus fluid is drawn into the pump through the inlet port 33 and discharged through the outlet port 26, the fluid being advanced by a series of continuously moving pockets defined between the inner and outer gear members as the inner gear member is driven. In the embodiment illustrated, the inner gear member projects outwardly beyond the sealing member 27 where a universal joint 34 connects it to a connecting rod 35. The opposite end of the connecting rod will be operatively connected to a prime mover by means of a second universal joint (not shown). The connecting rod and double universal joint, or their equivalents, are necessitated by the fact that the inner gear member rotates upon an axis eccentric to the axis of the outer gear member and also gyrates in a circular path. Where the inner gear member is driven from an external source, as just described, the device acts as a pump. However, it may also serve as a motor, in which event fluid under pressure preferably will be introduced through the outlet port 26, whereupon it will cause the inner gear member to rotate relative to the outer gear member as the fluid flows between the gears and is discharged through the inlet port 33. In this event, the connecting rod 35 will be operatively connected to the mechanism to be driven by the device. Irrespective of whether the device is operated as a motor or as a pump, the movement of the inner gear member will be the same.

Figures 5, 6:
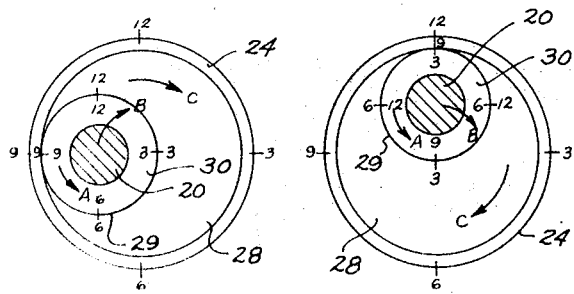
FIGS. 5 through 7 are schematic plan views illustrating the movement of the parts when the inner gear member both rotates and gyrates.
Figure 7:
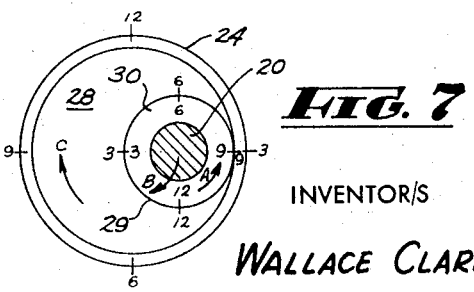

The operation of the device can be best understood by reference to FIGS. 5 through 7 which schematically illustrate the movement of the parts. For convenience of description the numerals 3, 6, 9, and 12 will serve to orient the parts in terms of the numerals on the face of a clock. Thus, FIG. 5 illustrates the parts in the same relative posit on as sown in FIG. 1 which may be assumed to be the rest or starting position. When in this position, the circular opening 29 in the annular sealing ring 28 will coincide with the casing 24 at the 9 -o'clock position, and the tire 30, which it will be remembered is fixedly secured to the inner gear member 20 and hence moves in unison with it, is also in contact with the wall of the casing at the 9-0'clock position. As is characteristic of a device of this character, when a motive force is applied to the inner gear member, it will rotate in a counterclockwise direction, as indicated by the arrow A. At the same time, however, the inner gear member will also gyrate in a circular path in a clockwise direction, such gating movement being indicated by the arrow B. As the inner gear member gyrates, it both pushes against and rotates relative to the opening 29 in the sealing ring 28, such movement causing the sealing ring to rotate relative to the casing 24 in a clockwise direction, as indicated by the Arrow C.

FIG. 6 illustrates the relative position of the parts upon completion of a one-quarter revolution of the inner gear member. As will be evident, the inner gear member and tire have rotated 90 ° in a clockwise direction, and the sealing ring 28 has also rotated 90° in a clockwise direction. The tire has thus effectively rolled along the inner surface of the casing and, as its gyrating movement pushes against the opening 29 in the sealing ring 28, the sealing ring rotates in a clockwise direction relative to the casing while, at the same time, the opening 29 orbits in a clockwise direction and slides relative to the periphery of the tire 30.

As the rotational and gyrating movement of the inner gear member continues, the parts move to the position illustrated in FIG. 7, which illustrates the position of the parts when the rotor is displaced 180° from the position illustrated in FIG. 5. As will be apparent, the inner gear member 20 and tire 30 will have continued to rotate in a counterclockwise direction while gyrating in a clockwise direction, the sealing ring 28 has also continued its clockwise rotation and the tire will continue to slide relative to the opening 29 as they move in opposite directions.

Upon completion of a single cycle of operation, the parts will have returned to the position illustrated in FIG. 5. In one cycle of operation the sealing ring and inner gear member (and tire) will each have rotated through 360° , but in opposite directions, and there will be 2-1 ratio in their relative speeds due to the fact that they are rotating in opposite directions. As should now be evident, the arrangement provides an effective closure or seal for the device while at the same time permitting the inner gear member to both rotate and gyrate.

Figure 8:
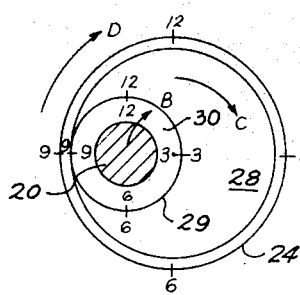
FIGS 8 through 10 are similar schematic views illustrating the movement of the parts where the outer gear member and casing rotate and the inner gear member gyrates but is held against rotation.
Figure 9:
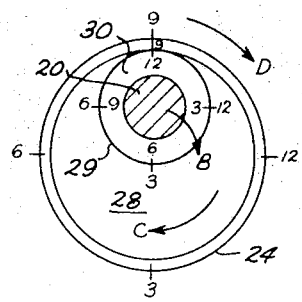
Figure 10:
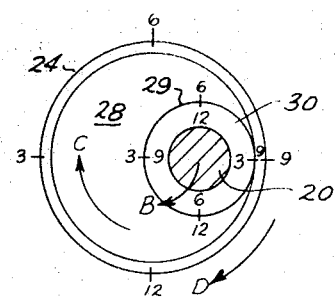

While the parts are the same, the sealing member operates in somewhat different manner where the outer gear member and casing are permitted to rotate and the inner gear member is held against rotation but is free to gyrate. This movement is illustrated in fig. 8 and 9 and 10 which illustrate successive positions of the parts through increments of 90° . In this instance, the inner gear member and tire will again gyrate in the direction of the arrow B and the sealing ring will rotate in the direction of the arrow C; but in addition, the outer gear member and casing will rotate in the direction of the arrow D. Thus, upon gyrating movement of the inner gear member and tire from the position of FIG. 8 to the position of FIG. 9 the sealing ring will have rotated 90° in a clockwise direction and a sliding movement has taken place between the opening 29 and the tire. However, the outer casing has also rotated through 90° in a clockwise direction and hence has moved in unison with the sealing ring.

It also should be pointed out that the sealing means of the present invention may be used in conjunction with a device wherein the inner gear member is held in fixed position and the outer gear member and the casing rotate an also gyrate. While such an arrangement has relatively limited utility it is nonetheless another example of the operation of a helical gear device embodying the sealing means of the invention.

Figure 3:
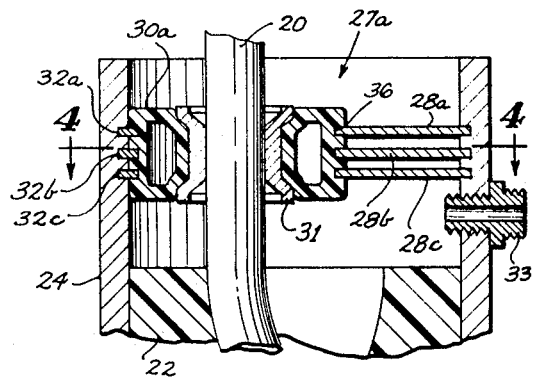
FIG. 3 is a an enlarged fragmentary vertical sectional view illustrating a modified sealing assembly.
Figure 4:
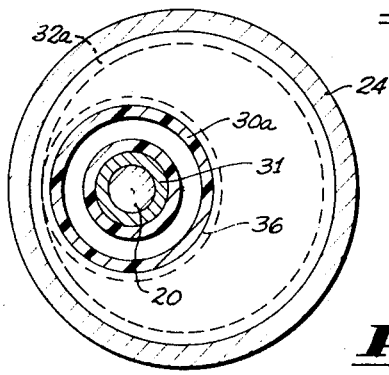
FIG. 4 is a sectional view taken along the line 4—4 of FIG. 3.

FIGS. 3 and 4 illustrate a modification of the invention wherein the sealing member 27a is provided with a plurality of sealing rings 28a, 28b and 28c received in annular grooves 32a, 32b, and 32c respectively in the casing 24. In this instance, the tire 30a is of the size to span the distance between the several sealing rings and, if desired, the tire may be provided with annular grooves or treads 36 adapted to engage the peripheries of the circular openings in the sealing rings in much the same manner as the periphery of the sealing rings are engaged by the grooves in the casing. Such multiple sealing ring arrangement provides enhanced sealing action. Preferably, however, the sealing ring or rings are loose fitting within the annular grooves in the casing both in outside diameter and in cross section, and in instances where the tire has grooves or treads engageable about the peripheral edges of the eccentrically disposed circular openings in the rings, the tire treads will be loose fitting with respect to the circular opening. The materials from which the sealing rings and tires are formed do not constitute limitations on the invention, although the tire will normally be formed from a resilient material, such as rubber, or from a plastic material having similar properties. Depending upon its size and use, the tire may be solid or hollow and in the latter event it may be inflated with a suitable inflating medium which may be either liquid or gaseous and, in the case of a liquid medium, suitable antifreeze chemical additives may be employed where required by the conditions of use. The sealing rings themselves may be formed from Teflon or other plastic materials which have inherent flexibility as well as a lubric quality, or they may be formed from other materials such as bronze, or similar metals for stronger thrust retention. The sealing rings may be of split-ring construction to facilitate their installation, the split preferably occurring in the area of closest approach between the eccentrically disposed opening and the periphery of the ring.

Figure 11:
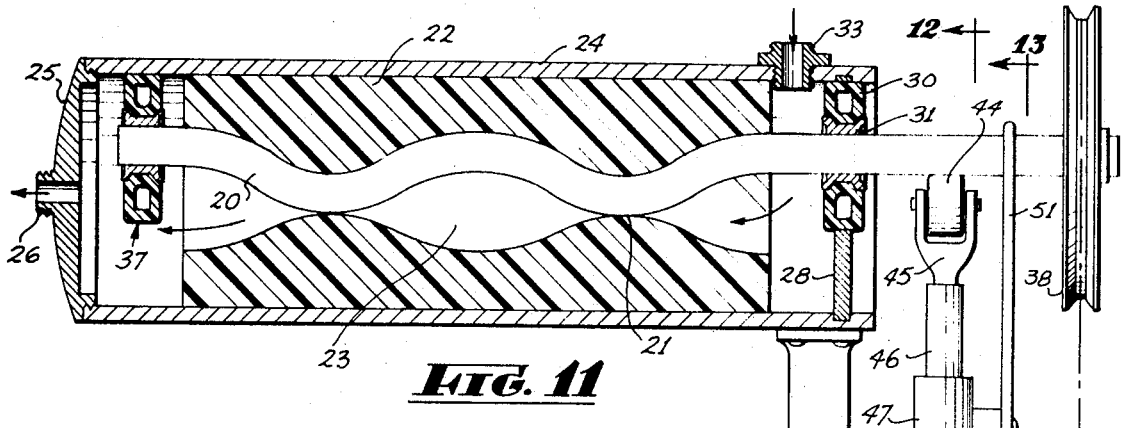
FIG. 11 is a side elevational view of a pump in which the inner gear member is driven by a belt, the device being provided with means to compensate for side pull on the inner gear member, together with means for stabilizing the inner gear member.

Referring next to FIG. 11, wherein like parts have been given like reference numerals, it will be noted that the end of the inner gear member 20 adjacent the cap member 25 has been provided with a tire and rim assembly, indicated at 37, which serves as a stabilizer for the inner gear member, the tire riding around the inner wall surface of the casing as the device is operated. The tire stabilizes and supports the otherwise free end of the inner gear member and maintains it at a uniform distance from the casing wall, thereby inhibiting wabbling or other undesirable sidewise movement of the inner gear member.

Figure 14:
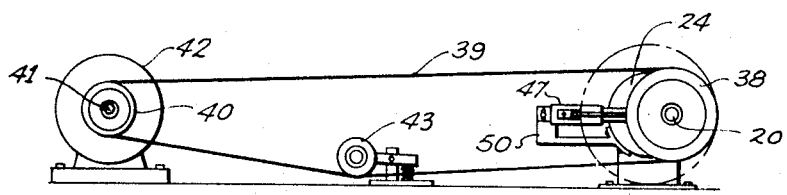
FIG. 14 is a side elevational view illustrating the belt drive arrangement for the device of FIG. 11.
Figure 12:
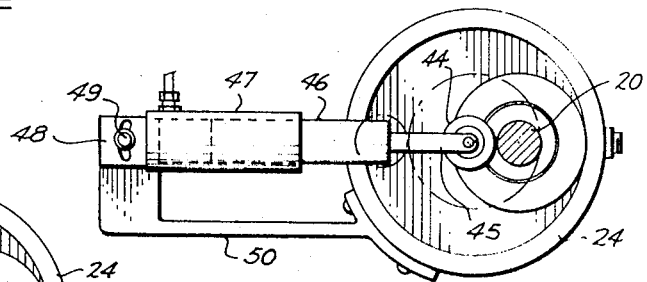
FIG. 12 is a sectional view taken along the line 12 —12 of FIG. 11.

FIG. 11 also serves to illustrate the manner in which the inner gear member of a pump may be driven by means of a sheave and pulley, to the elimination of the connecting rod and universal joint assembly heretofore required. Thus, a sheave 38 is mounted on the projecting end of the rotor 20 and, as will be seen in FIG. 14, a conventional drive belt 39 extends between the sheave 38 and a sheave 40 mounted on the drive shaft 41 of a prime mover, such as the electric motor 42. Since the sheave 38 will orbit in a circular path as the inner gear member 20 is rotated and hence move toward and away from the sheave 40, a spring-biased idler 43 is provided to maintain the belt in taut condition as the sheave moves toward and away from the prime mover.

Means are also provided to compensate for side pull on the inner gear member when the tire is moving against the pull of the drive belt. This is accomplished by providing a support wheel 44, which is preferably resilient, rotatably mounted on a forked arm 45 on the end of the rod 46 of hydraulic piston 47. The piston is secured to a bracket 48 pivotally connected at 49 to a supporting arm 50 which may be conveniently mounted on the pump casing 24. The piston will be hydraulically loaded to exert a constant pressure against the inner gear member equal to the side pull of the drive belt, the piston and support wheel effectively serving as a steady rest for the inner gear member.

Figure 13:
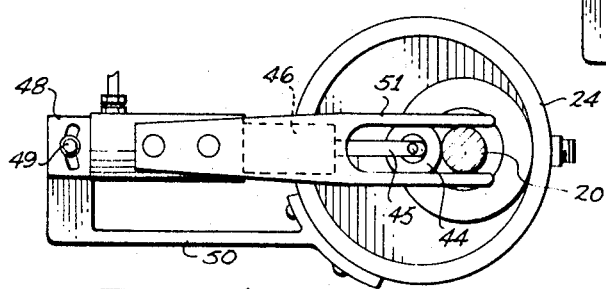
FIG. 13 is a sectional view taken along the line 13 —13 of FIG. 11.

Since the inner gear member will be gyrating in a circular path, means are provided to maintain the support wheel 44 in contact with the moving inner gear member. To this end, the piston 47 mounts a forked guide arm 51 which, as best seen in FIG. 13, engages the inner gear member 20 and is oscillated by it. The arm 20 in turn oscillates the piston 47 which is pivotally mounted on the arm 50, and hence the support wheel 44 is also oscillated in timed relation to the gyrating movement of the inner gear member. With such arrangement the side pull of the belt is stabilized to compensate for pull which would tend to interfere with the normal movement of the inner gear member. Preferably the surfaces of the forked guide contacting the inner gear member will be covered with an antifriction material, or an antifriction sleeve may be placed around the inner gear member itself.

As should now be evident, the instant invention provides an improved helical gear pump or motor construction which greatly enchances the utility of the devices by permitting the elimination of the connecting rods and universal joint assemblies heretofore required, or if they are still used, they may be placed outside the confines of the pump assembly where they may be readily inspected, serviced or replaced. Modifications may be made in the invention without departing from its spirits and purposes. Numerous such modifications have already been given and others will undoubtedly occur to the skilled worker in the art upon reading this specification. For example, an adjustable spring mechanism may be used instead of an hydraulic piston to stabilize side pull of the drive belt, although stabilizing means may not be required in instances wherein the eccentricity of the inner gear member is relatively small and it is driven by a V-belt or chain drive. Diverse types of chain and belt drives may be employed, and in the claims which follow the terms "sheave" and "belt" are intended to generically characterize the drive means.

The embodiments of the invention in which an exclusive property or privilege is claimed are defined as follows:

1. In a device having inner and outer helical gear members rotatable relative to each other and mounted within a casing having a cylindrical inner surface, said inner of having an axis eccentric to the axis of the outer gear member and to the longitudinal axis of the casing, a tire mounted on said inner gear member, said tire having a diameter less than the inside diameter of said casing and of the size to contact the inner surface of said casing when concentrically mounted on said inner gear member.

2. The device claimed in claim 1 wherein said tire comprises a part of a sealing member for said casing, said sealing member including a circular disc the periphery of 31 f which engages the inner surface of said casing, said disc having an eccentrically disposed circular opening therein closely surrounding said tire.

3. The device claimed in claim 2 wherein said casing has an annular groove in its inner surface in which the periphery of said circular disc is received.

4. The device claimed in claims 2 and 3 wherein said tire has an annular tread therein engageable with said disc around the periphery of the opening therein.

5. The device claimed in claim 2 wherein said tire is hollow and is filled with an inflating medium.

6. The device claimed in claim 2 wherein said sealing member comprises a plurality of said circular discs arranged in side-by-side relation, said tire being surrounded by the circular opening in each of said discs.

7. The device claimed in claim 6 wherein each of said discs is received in an annular groove in the inner surface of said casing.

8. The device claimed in claim 2 wherein said device comprises a pump, wherein said inner gear member has a projecting end mounting a sheave adapted to be driven by a belt extending at substantially right angles to the axis of said inner gear member, and means for stabilizing side pull on said inner gear member by said belt drive, said means comprising a wheel engaging said inner gear member in opposition to the pull of said belt, and means for applying pressure to said wheel to stabilize the side pull of said belt.

9. The device claimed in claim 8 wherein said inner gear member gyrates in a circular path, wherein said wheel is pivotally mounted to follow said inner gear member as it gyrates, and guide means for pivoting said wheel in synchronism to the gyrating movement of said inner gear member.

10. The device claimed in claim 9 wherein said guide means comprises an arm fixedly secured relative to said wheel, said arm having a forked end engageable about said gear member for movement thereby.

11. The device claimed in claim 10 wherein the means for applying pressure to said wheel comprises an hydraulic piston.

12. The device claimed in claim 8 wherein said belt drive includes a spring-biased idler acting to maintain the belt in taut condition.

UNITED STATES PATENT OFFICE
CERTIFICATE OF CORRECTION

Patent No. 3,627,453　　　　　　　　　Dated December 14, 1971

Inventor(s) Wallace Clark

It is certified that error appears in the above-identified patent and that said Letters Patent are hereby corrected as shown below:

COLUMN 1, LINE 13, "of" (before "stator") should be -- or --;
    line 18, "trough" should be -- through --;
    line 34, "grate" should be -- gyrate --;
    line 48, "choses" should be -- closes --; same line after "closes" insert -- one --;
    line 72, "trough" should be -- through --;

COLUMN 2, line 19, "of" (after "assuming") should be cancelled;
    line 24, "fire" should be -- tire --;
    line 52, "rotted" should be -- rotated --;
    line 57, "beltdrive" should be -- belt drive --;
    line 60, "trough" should be -- through --.

COLUMN 3, line 39, "the" should be inserted between "with" and "inner"

COLUMN 4, line 2, "positon" should be -- position --;　same line "sown" should be -- shown --;
    line 14, "gating" should be -- gyrating --;
    line 55, "fig." should be -- FIG. --;
    line 72, "an" (after "rotate") should -- and --.

COLUMN 5, line 12, "lose" should be -- loose --;
    line 43, after "operated" and before "The" insert a period (.)

COLUMN 6, line 38, (Claim 1, line 3), after "inner" cancel "of" and insert -- gear member --;
    line 47, (Claim 2, line 3) cancel "31 f".

Signed and sealed this 13th day of March 1973.

(SEAL)
Attest:

EDWARD M. FLETCHER, JR.　　　　　　　ROBERT GOTTSCHALK
Attesting Officer　　　　　　　　　　Commissioner of Patents